Jan. 2, 1940.  E. R. HACMAC  2,185,846
BEATER AND MIXER
Filed Nov. 2, 1938
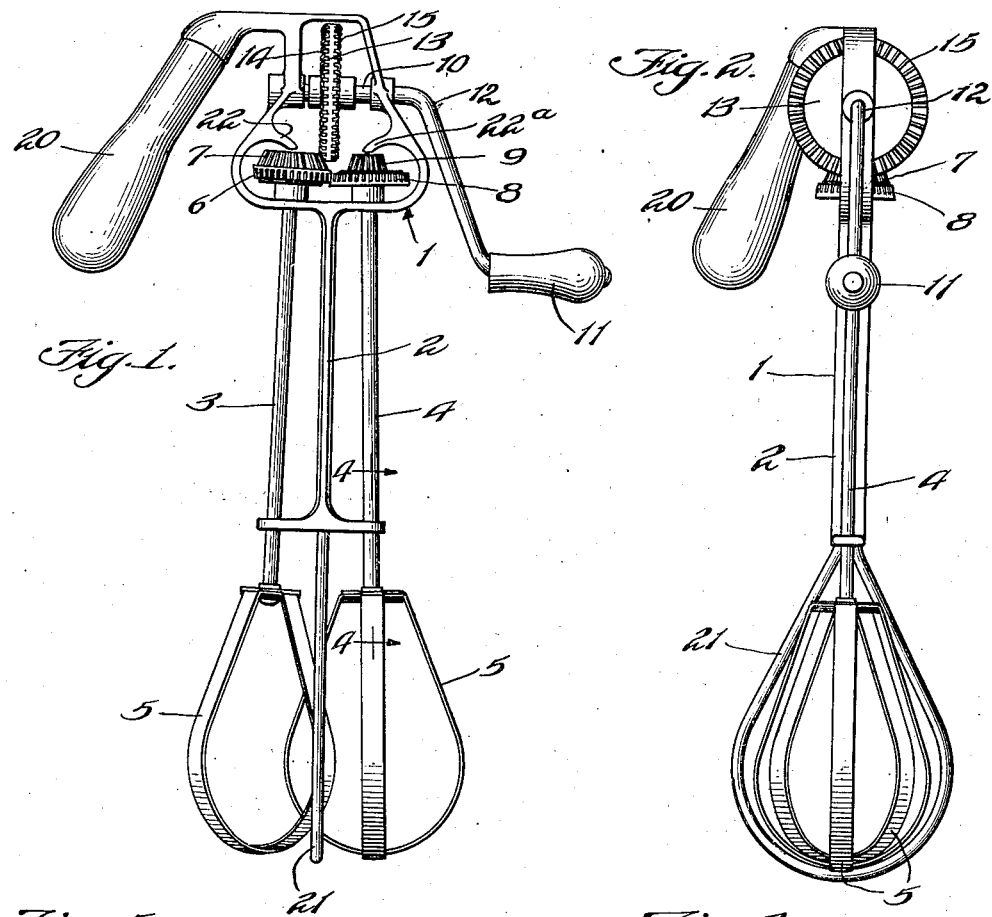
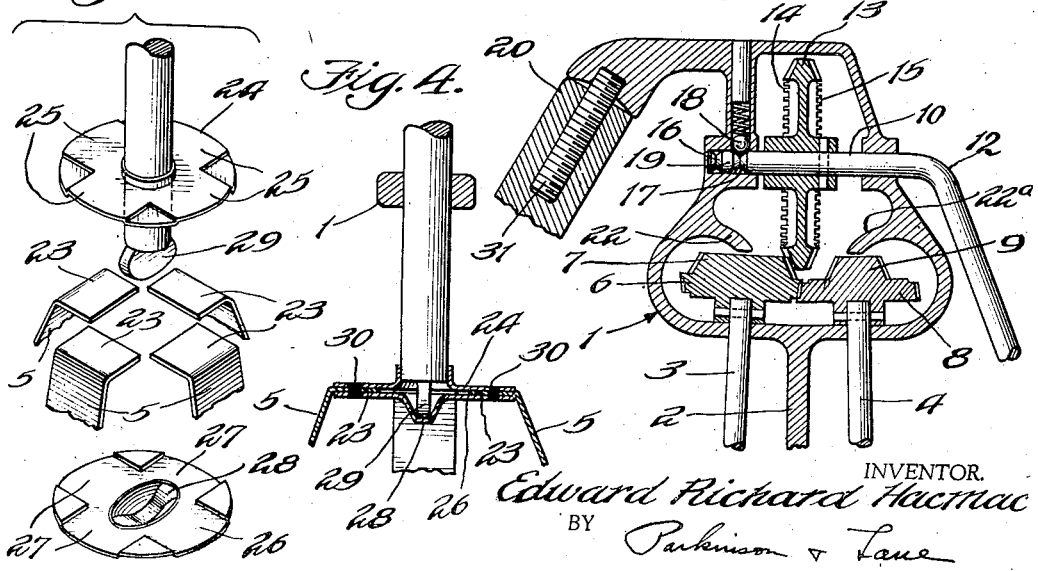
INVENTOR.
Edward Richard Hacmac
BY Parkinson & Lane
ATTORNEY.

Patented Jan. 2, 1940

2,185,846

UNITED STATES PATENT OFFICE 2,185,846

BEATER AND MIXER

Edward Richard Hacmac, Hollywood, Calif., assignor to Na-Mac Products Company, a corporation of California Application November 2, 1938, Serial No. 238,454

1 Claim. (Cl. 259—131)

The present invention relates to a novel construction of beater and mixer and more particularly to a novel means for securing the mixing and beating elements to their shafts.

Among the objects of the present invention is the provision of a strong, sturdy device of the kind described having far less number of parts than the devices now on the market. Another object is to provide a novel gearing arrangement for an interdigitating beater and mixer so constructed as to provide quick adjustment for different speeds as required in the operation of such a device.

The present invention is an improvement on the beater and mixer shown in my pending application Serial No. 208,132, filed May 16, 1938.

Further objects, advantages and capabilities will be apparent from the disclosure or are inherent in the device.

In the drawing:

Fig. 1 is a view in side elevation of my novel beater and mixer;

Fig. 2 is a front elevational view thereof.

Fig. 3 is an enlarged fragmentary view in vertical cross section of the main portion of the frame and the gearing device therein;

Fig. 4 is an enlarged fragmentary view of the lower end of a shaft for my novel beating and mixing element;

Fig. 5 is a fragmentary view in perspective of the parts providing a connection for my beating and mixing element and a shaft therefor.

Referring more particularly to the disclosure in the drawing, there is shown a novel construction of mixer and beater provided with a skeleton or cut-away frame 1 depending from which is an elongated inverted T-shaped member 2, the cross piece of this member and the lower portion of the frame both being provided with suitable openings to receive and provide bearings for rotatable driven shafts 3 and 4 at the lower end of which are secured the novel interdigitating beating and mixing elements 5. Secured or pinned to the shaft 3 adjacent its upper end is gear 6 having fixed bevel gear or pinion 7 on its upper surface. The gear 6 meshes with the gear 8 secured or keyed on the shaft 4, this gear 8 having secured on its upper surface a bevel gear or pinion 9. The bevel gears or pinions 7 and 9 are shown of different diameters for the purpose of providing different speeds of rotation of the driven gears 6 and 8 and their respective shafts and beating and mixing elements.

Rotatably mounted in the bearings formed in the skeleton frame 1 is a rotatable drive shaft 10 integrally provided with a crank arm 12 having a handle 11 on its outer end for manual rotation of the drive shaft. The rotatably mounted shaft 10 is longitudinally slidable in these bearings. Secured or keyed to this shaft is a gear 13 having gear faces 14 and 15 on its opposite sides, the teeth of the faces 14 and 15 being adapted to be moved into driving engagement with the bevel gears or pinions 7 and 9, respectively. When the teeth on the face 14 are in driving engagement with the teeth on the bevel gear or pinion 7, the gear 13 will drive the bevel gear or pinion 7, gear 6 and gear 8 so as to rotate the shafts 3 and 4 and their beating and mixing elements 5 in opposite directions.

In order to retain the bevel drive gear 13 in meshing engagement with the gear or pinion 7 or with the gear or pinion 9, means are provided for locking the shaft 10 in either position of adjustment. This is accomplished by means of a pair of spaced annular races 16 and 17 formed in the shaft adapted to interlock with a spring-pressed ball or detent 18. This ball or detent will permit ready manual shifting of the shaft but prevent unintentional accidental displacement or operation of the intermeshing bevel gears after the driving gear 13 has been moved into driving engagement with either of the gears or pinions 7 and 9. The section 19 between the races 16 and 17 in my improved construction is of substantially conical construction whereby to prevent the ball or detent 18 from coming to rest in dead center or in inoperative position between the bevel gears 7 and 9.

In order to securely hold the beating and mixing elements in operative position the invention comprehends a handle 20 suitably attached or threaded to a projection 22 extending from the upper portion of the frame 1 whereby to provide sufficient clearance between the handle and the frame for insertion of the hand of the user. In order that the beating and mixing elements 4 do not contact or scrape the bottom of the container in which the device is to be used, I provide a U-shaped member or stirrup 21 extending beyond the outer ends of the beaters so as to maintain them spaced from the bottom of the container. To limit upward movement of the shafts 3 and 4, I provide extensions 22 and 22ª integrally formed with the inner sides of the skeleton frame 1 and terminating just above the tops of the bevel gears 7 and 9.

My invention also relates to the novel stirring and beating elements and the means for attaching them to their shafts, shown in detail in Figs.

4 and 5. These elements each comprise one or a plurality (preferably two) of metallic U-shaped or stirrup members terminating in inwardly extending flanges 23, the members being preferably secured to the end of the shaft at right angles to each other. The attaching means comprises circular disk 24 having intersecting depressions 25 therein and disk 26 provided with complementary depressions 27. Disk 24 is also provided with a suitable opening having a collar for receiving a shaft 3 or 4 and disk 26 is formed with a central depression or seat 28 to receive flattened projection or stop member 29 on the end of the shaft. In assembling the elements on the shaft, disk 24 is placed on the shaft and disk 26 is placed under it whereby projection or stop 29 is received in depression or seat 28 therein. The depressions 25 and 27 on the disks 24 and 26 will face each other to form wells for the reception of the flanges 23 on the stirring elements 5. The parts are then secured together in any suitable manner as by punching or crimping as shown at 30 in Fig. 4. It is thus apparent that the beating and mixing elements may be securely attached to their respective shafts simply and easily and that the connection will be permanent.

Having disclosed the invention, I claim:

In a device of the type disclosed having a frame and operating mechanism thereon, a driven shaft having a stop member at its lower end, a set of disks, complementary depressions in said disks forming wells, beating and mixing elements extending into said wells, the lower disk having a seat for receiving the stop member, and means for fastening the disks and elements together to lock them to the shaft and form a unitary structure therewith for the purpose set forth.

EDWARD RICHARD HACMAC.